Jan. 3, 1967     T. J. SLONE     3,295,720

CONTROL CIRCUIT FOR AN ADSORPTION OR DESORPTION SYSTEM

Filed Oct. 20, 1965

INVENTOR
THOMAS J. SLONE

BY Herman L. Gordon

ATTORNEY

United States Patent Office 3,295,720
Patented Jan. 3, 1967

3,295,720
CONTROL CIRCUIT FOR AN ADSORPTION OR DESORPTION SYSTEM
Thomas J. Slone, Silver Spring, Md., assignor to American Instrument Co., Inc., Silver Spring, Md.
Filed Oct. 20, 1965, Ser. No. 498,943
8 Claims. (Cl. 222—3)

This invention relates to fluid flow control systems, and more particularly to means for controlling the valves in a fluid adsorption or desorption system so as to automatically open and close the valves in response to extreme variations in the accumulation of fluid in a portion of the system.

A main object of the invention is to provide an improved control circuit for use in fluid adsorption or desorption systems, the circuit acting to monitor the system with which it is employed so as to maintain the fluid pressure therein between predetermined limits, the circuit being relatively simple in construction, being stable in operation, being relatively unaffected by switching transients, and being relatively insensitive to contact resistance effects.

A further object of the invention is to provide an improved monitoring circuit for a fluid adsorption or desorption system wherein pressure fluctuations may occur in a portion of the system caused by changing conditions in the system, the circuit involving relatively inexpensive components, being reliable in operation, being substantially immune to transients, and automatically setting itself to operate in the proper direction so that it cannot cause any unwanted valve operations.

A still further object of the invention is to provide an automatic fluid flow control system employing a mercury column as a pressure-sensitive element reacting to changes in pressure in a certain portion of a fluid adsorption or desorption system and coacting with spaced contacts to signal abnormal pressure conditions in the system, the system including a control circuit which responds to the fluctuations in height of the mercury column to operate valves in the system in a manner to reverse the direction of fluid flow as required for normal adsorption or desorption operation, the circuit being substantially unaffected by power transients or interruptions, being relatively free of switching transients and being very stable in performance.

Further objects and advantages of the invention will become apparent from the following description and claims, and from the accompanying drawings, wherein:

Figure 1:
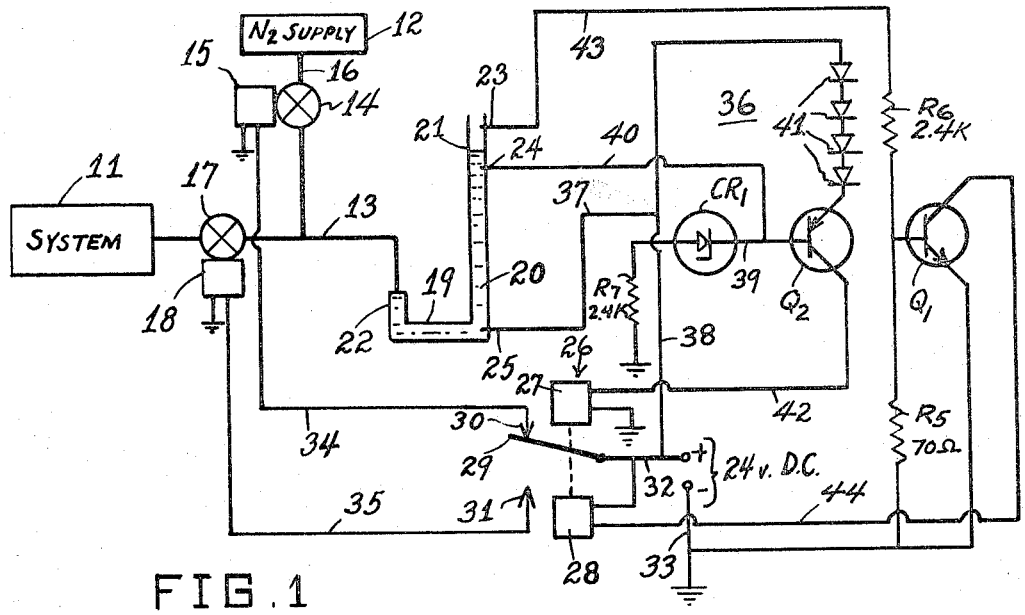
FIGURE 1 is a schematic block diagram of a fluid adsorption system provided with an improved monitoring and stabilizing circuit constructed in accordance with the present invention.

Referring to the drawings, and more particularly to FIGURE 1, 11 designates a system, for example, an apparatus for measuring porosity, or other equivalent apparatus, wherein doses of a suitable pressurized gas, such as nitrogen from a supply source 12, are to be fed in a manner to be adsorbed in the system and wherein it is necessary to maintain the gas pressure in a supply conduit 13 leading to the system between predetermined limiting values for proper operation of the apparatus.

As shown in FIGURE 1, the pressurized nitrogen supply source 12 is connected by a conduit 16 to the supply conduit 13 through suitable control valve means, such as an electromagnetically operated valve 14 provided with an operating solenoid or equivalent electrical actuator designated at 15. The supply conduit 13 is provided with a similar valve 17, located between the system 11 and the connnection to conduit 13, as shown, the valve 17 being provided with an operating solenoid or equivalent electrical actuating means designated at 18. The valves 14 and 17 open responsive to the energization of their respective actuating means 15 and 18.

Designated at 19 is a U-tube containing mercury 20 and having the upstanding vertical mercury column arm 21, the top of which is evacuated, the opposite arm 22 being connected to the supply conduit 13 so that variations in gas pressure in the conduit 13 cause corresponding fluctuations in the height of the mercury column in arm 21. A pair of vertically spaced contacts 23 and 24 in the upper portion of arm 21 respectively represent the desired high and low mercury level limits corresponding to the limiting high and low gas pressure values which can be tolerated in conduit 13 to maintain proper dosage of nitrogen to the system 11.

Column arm 21 is provided with a bottom contact 25 which is in constant electrical contact with the mercury 20.

Energization of the valve actuators 15 and 18 is controlled by a conventional two-coil latching relay, designated generally at 26, which may be similar to Model KB17DG, manufactured by Potter and Brumfield, a division of American Machine and Foundry Co., Princeton, Indiana. Relay 26 is provided with the upper coil 27, the lower coil 28, and one or more poles 29, each engageable either with an associated upper contact 30 or an associated lower contact 31, depending upon which coil 27 or 28 was last energized. FIGURE 1 illustrates the relay pole 29 in engagement with its upper contact 30.

Pole 29 is connected by a wire 32 to the positive terminal of a suitable current supply source, such as a 24-volt D.C. supply source. The negative terminal of said source is grounded, as by a wire 33.

One terminal of each of the valve actuators 15 and 18 is grounded, the other terminals thereof being connected respectively by wires 34 and 35 to the relay contacts 30 and 31. In the position of pole 29 shown, valve actuator 15 is energized, since wire 34 is connected through contact 30 and pole 29 to the positive supply wire 32. This opens valve 14 and allows pressurized nitrogen to flow into supply conduit 13. When relay coil 28 becomes energized, pole 29 disengages from contact 30, deenergizing actuator 15 and closing valve 14, and engages contact 31, energizing actuator 18 and opening system valve 17, thereby allowing the nitrogen from conduit 13 to be admitted into the system 11.

Designated generally at 36 is a trigger circuit for selectively energizing the relay coils 27 and 28 in accordance with the fluctuations of the height of the column of mercury 20 in arm 21.

The doser trigger circut comprises a PNP transistor $Q_2$ connected so as to control relay coil 27 and an NPN transistor $Q_1$ connected so as to control relay coil 28. Bottom contact 25 is connected by wires 37 and 38 to the positive current supply wire 32. The base of transistor $Q_2$ is connected by a wire 39 through a Zener diode $CR_1$ and a resistor $R_7$ to ground. Zener diode $CR_1$ is rated to conduct at approximately 14 volts, and may be similar to General Electric Co. type Z4XL14. Resistor $R_7$ has a value of 2400 ohms. Contact 24 is connected by a wire 40 to wire 39. Wire 38 is connected through a series of four diodes 41 to the emitter of transistor $Q_2$. One terminal of upper relay coil 27 is grounded and the other terminal thereof is connected by a wire 42 to the collector of transistor $Q_2$.

Upper contact 23 is connected by a wire 43 through a resistor $R_6$ to the base of transistor $Q_1$. Resistor $R_6$ has a value of 240 ohms. The base of transistor $Q_1$ is connected to ground through a resistor $R_5$ of 70 ohms. One terminal of lower relay coil 28 is connected to positive supply wire 32 and the other terminal thereof is connected by a wire 44 to the collector of transistor $Q_1$. The emitter of transistor $Q_1$ is grounded.

When the column of mercury 20 in arm 21 is below contact 24, transistor $Q_2$ is conducting, so that wire 42 is connected through the diodes 41 and wire 38 to positive supply wire 32. Relay coil 27 is energized, and pole 29 engages contact 30, thus energizing valve actuator 15 and causing valve 14 to open. Nitrogen is admitted into conduit 13, causing the mercury column to rise. When the mercury 20 engages contact 24, the base of transistor $Q_2$ is connected to positive supply wire 32 through wire 40, mercury 20, and wires 37 and 38. This turns off transistor $Q_2$, deenergizing relay coil 27. However, pole 29 remains in engagement with contact 30 and valve actuator 15 remains energized, keeping valve 14 open. As the mercury in arm 21 continues to rise it engages upper contact 23, thereby connecting the base of transistor $Q_1$ to positive supply wire 32 through resistor $R_6$, wire 43, mercury 20 and wires 37 and 38. This places sufficient bias on the base of transistor $Q_1$ to cause said transistor to conduct, thereby connecting wire 44 to ground and causing lower relay coil 28 to become energized. This moves pole 29 away from contact 30 and into engagement with lower contact 31, thereby deenergizing valve actuator 15 and energizing valve actuator 18. Valve 14 closes, cutting off the supply of nitrogen, and valve 17 opens, allowing the gas in conduit 13 to be admitted into the system 11. As the gas is adsorbed, the pressure in conduit 13 drops and the mercury 20 drops below contact 23, turning off transistor $Q_1$ and deenergizing relay coil 28. However, pole 29 remains in engagement with lower contact 31, keeping valve 17 open until the mercury 20 drops below contact 24, thereby removing the positive voltage from the base of transistor $Q_2$, whereupon transistor $Q_2$ again conducts and energizes upper relay coil 27, moving pole 29 away from contact 31 and into engagement with upper contact 30. Valve 14 is thus reopened to admit another dose of nitrogen into conduit 13.

It will be noted that neither relay coil 27 or 28 is energized when the mercury level is between contacts 23 and 24, but the relay retains the same state produced by the coil thereof last energized. The circuit is therefore such that it remembers during power transients or interruptions in which direction the mercury column was travelling before the interruption and continues or resumes its travel in the proper direction when normal power is restored.

By placing the "high" and "low" contacts 23 and 24 in the base circuits of the transistors (to furnish power to the relay coils), a large amount of contact resistance (several hundred ohms in the worst case) can be tolerated before reliable control is impaired. Electrodes 23 and 24 are preferably made of platinum, and work well in the unsealed manometer column 21.

Figure 2:
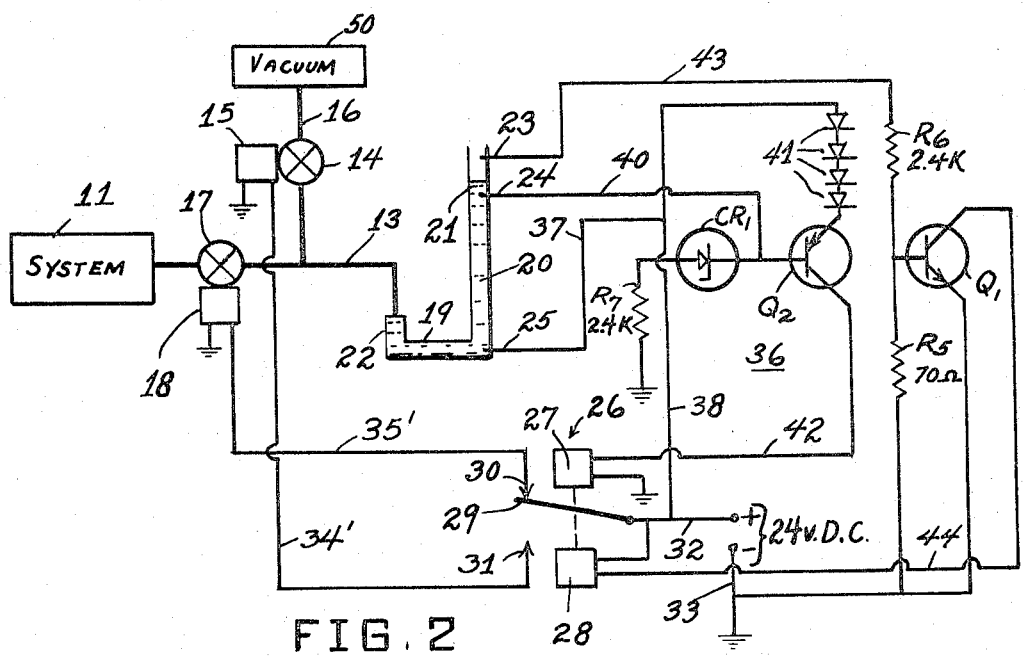
FIGURE 2 is a schematic block diagram of a fluid desorption system employing an improved control circuit according to the present invention.

In FIGURE 2, the same trigger circuit 36 is employed except that it controls desorption from the system 11. The term "desorption" is defined in Chambers Technical Dictionary, third edition, MacMillan Company, New York, revised 1958, as: "The removal of a substance from the surface at which it is adsorbed." The word "desorb" is therefore accordingly defined herein as: "To remove a substance from a surface at which it is adsorbed." A vacuum pump or other vacuum means 50 is connected through conduit 16 and valve 14 to the conduit 13. The ungrounded terminal of valve actuator 15 is connected by a wire 34' to lower relay contact 31 and the ungrounded terminal of valve actuator 18 is connected by a wire 35' to the upper relay contact 30. When the mercury 20 is below contact 24, actuator 18 is energized and valve 17 is open, allowing gas to be desorbed from the system 11 into conduit 13. When the gas pressure in conduit 13 is sufficient to raise the mercury 20 into contact with electrode 24, relay coil 27 becomes deenergized, but valve actuator 18 remains energized until the mercury rises sufficiently to engage upper electrode 23. At this point, transistor $Q_1$ conducts, energizing lower relay coil 28, causing pole 29 to disengage from upper contact 30 and engage lower contact 31. This closes system valve 17 and opens the vacuum valve 14, allowing the accumulated gas to be drawn out of conduit 13. Valve 14 remains open when the mercury level drops below electrode 23, since pole 29 continues to engage lower contact 31. As the mercury level drops further and falls below electrode 24, transistor $Q_2$ conducts and again energizes relay coil 27, causing vacuum valve 14 to close and system valve 17 to reopen.

The valve control arrangement of FIGURE 2 provides the same advantages above mentioned in connection with the arrangement of FIGURE 1.

While certain specific embodiments of fluid flow control systems have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A doser trigger control circuit for a fluid distributing assembly of the type comprising a main conduit connected to a system which adsorbs or desorbs gas and a branch conduit connected to said main conduit for supplying gas to or releasing gas from said main conduit, said main conduit being provided with a normally closed system valve located between said system and the branch conduit and said branch conduit being provided with a normally closed branch valve, first electrical actuator means operatively connected to said system valve, second electrical actuator means operatively connected to said branch valve, a mercury manometer connected to said main conduit and having an upstanding arm containing a column of mercury which rises and falls responsive to increases and decreases of fluid pressure in said main conduit, a two-coil latching relay comprising a first coil and a second coil, a contact pole, and respective stationary contacts engageable by said pole responsive to the preceding energization of a corresponding one of said coils, circuit means to energize the first actuator means when the pole engages one of said stationary contacts, whereby to open said system valve while the branch valve remains closed, circuit means to energize the second actuator means when the pole engages the other of said stationary contacts, whereby to open the branch valve and close the system valve, a pair of vertically spaced electrodes in said upstanding arm, means to energize one of said relay coils when the mercury drops below the lower electrode, and means to energize the other relay coil when the mercury rises sufficiently to engage the upper electrode.

2. A doser trigger control circuit for a fluid distributing assembly of the type comprising a main conduit connected to a system which adsorbs or desorbs gas and a branch conduit connected to said main conduit for supplying gas to or releasing gas from said main conduit, said main conduit being provided with a normally closed system valve located between said system and the branch conduit and said branch conduit being provided with a normally closed branch valve, first electrical actuator means operatively connected to said system valve, second electrical actuator means operatively connected to said branch valve, a mercury manometer connected to said main conduit and having an upstanding arm containing a column of mercury which rises and falls responsive to increases and decreases of fluid pressure in said main conduit, a two-coil latching relay, means to energize only the first actuator means responsive to the energization of one of the coils of the relay, whereby to open said system valve while the branch valve remains closed, means to energize only the second actuator means responsive to the energization of the other coil of the relay, whereby to open the branch valve and close the system valve, a pair of vertically spaced electrodes in said upstanding arm, means to energize only one of said relay coils when the mercury drops below the lower electrode, and means to energize only the other relay coil when the mercury rises sufficiently to engage the upper electrode.

3. A doser trigger control circuit for a fluid distributing assembly of the type comprising a main conduit connected to a system which adsorbs or desorbs gas and a branch conduit connected to said main conduit for supplying gas to or releasing gas from said main conduit, said main conduit being provided with a normally closed system valve located between said system and the branch conduit and said branch conduit being provided with a normally closed branch valve, first electrical actuator means operatively connected to said system valve, second electrical actuator means operatively connected to said branch valve, a mercury manometer connected to said main conduit and having an upstanding arm containing a column of mercury which rises and falls responsive to increases and decreases of fluid pressure in said main conduit, a two-coil relay, means to energize only the first actuator means responsive to the energization of one of the coils of the relay, whereby to open said system valve while the branch valve remains closed, means to energize only the second actuator means responsive to the energization of the other coil of said relay, whereby to open the branch valve and close the system valve, means to energize only one of said relay coils when the mercury drops below a predetermined lower level limit, and means to energize only the other relay coil when the mercury rises to a predetermined upper level limit in said upstanding arm.

4. In a fluid distribution assembly, a system which adsorbs or desorbs gas, a main conduit connected to the system, a branch conduit connected to said main conduit for supplying gas to or releasing gas from said main conduit, said main conduit being provided with an electrically operated normally closed system valve located between said system and the branch conduit, said branch conduit being provided with an electrically operated normally closed branch valve, a two-coil relay, means to energize the system valve responsive to the energization of one of the relay coils, means to energize the branch valve responsive to the energization of the other relay coil, means to energize only one of the relay coils when the gas pressure in the main conduit drops below a predetermined lower limit value, whereby to open one of said valves while the other valve remains closed, and means to energize only the other relay coil when the gas pressure in the main conduit reaches a predetermined upper limit value, whereby to open said other valve and to close said one of the valves, said relay including means to maintain each valve energized until the relay coil associated with the other valve becomes energized.

5. In a fluid distribution assembly, a system which adsorbs or desorbs gas, a main conduit connected to the system, a branch conduit connected to said main conduit for supplying gas to or releasing gas from said main conduit, said main conduit being provided with an electrically operated normally closed system valve located between said system and the branch conduit, said branch conduit being provided with an electrically operated normally closed branch valve, pressure-responsive means connected to said main conduit, a two-coil relay, means to energize the system valve responsive to the energization of one of the relay coils, means to energize the branch valve responsive to the energization of the other relay coil, first circuit means operatively controlled by said pressure-responsive means to energize only one of the relay coils when the gas pressure in the main conduit drops below a predetermined lower limit value, whereby to open one of said valves while the other valve remains closed, and second circuit means operatively controlled by said pressure-responsive means to energize only the other relay coil when the gas pressure in the main conduit reaches a predetermined upper limit value, whereby to open said other valve and to close said one of the valves, said relay including means to maintain each valve energized until the relay coil associated with the other valve becomes energized.

6. The assembly recited in claim 5, and wherein said first circuit means comprises a source of current, a first transistor, and means connecting said one relay coil to said source through said first transistor, and wherein said second circuit means comprises a second transistor and means connecting the other relay coil to the source through said second transistor, and circuit means including said pressure-responsive means controlling the bias voltages applied to said transistors.

7. The assembly recited in claim 5, wherein said pressure-responsive means comprises a mercury manometer tube provided with a bottom electrode and vertically spaced upper- and lower-pressure limit electrodes, and wherein said first circuit means comprises a source of current, a first transistor, and means connecting said one relay coil to said source through said first transistor, and wherein said second circuit means comprises a second transistor and means connecting the other relay coil to the source through said second transistor, circuit means connecting the source to the control electrode of the first transistor through said bottom electrode and said lower-pressure limit electrode, and circuit means connecting the source to the control electrode of the second transistor through said bottom electrode and said upper-pressure limit electrode.

8. The assembly recited in claim 7, and circuit means to render the first transistor conducting when the mercury level drops below the level of the lower-pressure limit electrode, and circuit means to render the second transistor conducting when the mercury level rises to the level of the upper-pressure limit electrode.

References Cited by the Examiner

UNITED STATES PATENTS

| | | | |
|---|---|---|---|
| 2,072,314 | 3/1937 | Rhodes | 200—81.6 |
| 2,085,956 | 7/1937 | Clarke et al. | 222—399 X |
| 2,920,159 | 1/1960 | Snyder | 200—81.6 X |
| 2,921,714 | 1/1960 | Richeson | 222—396 X |
| 3,116,370 | 12/1963 | Andregg et al. | 194—9 X |

ROBERT B. REEVES, *Primary Examiner.*

N. L. STACK, *Assistant Examiner.*